United States Patent [19]

McCullough, Jr. et al.

[11] Patent Number: 4,865,931
[45] Date of Patent: Sep. 12, 1989

[54] SECONDARY ELECTRICAL ENERGY STORAGE DEVICE AND ELECTRODE THEREFOR

[75] Inventors: Francis P. McCullough, Jr.; Alvin F. Beale, Jr., both of Lake Jackson, Tex.

[73] Assignee: The Dow Chemical Company, Midland, Mich.

[21] Appl. No.: 678,186

[22] Filed: Dec. 4, 1984

Related U.S. Application Data

[63] Continuation-in-part of Ser. No. 558,239, Dec. 5, 1983, abandoned.

[51] Int. Cl.[4] .............................................. H01M 4/58
[52] U.S. Cl. .................................. 429/194; 429/218; 423/447.2
[58] Field of Search .............................. 429/194, 218; 423/447.2

[56] References Cited

U.S. PATENT DOCUMENTS

| | | | |
|---|---|---|---|
| 3,844,837 | 10/1974 | Bennion et al. | 429/199 X |
| 4,005,183 | 1/1977 | Singer | 423/447.2 |
| 4,285,831 | 8/1981 | Yoshida et al. | 423/447.2 X |
| 4,423,125 | 12/1983 | Basu | 429/218 X |

*Primary Examiner*—Stephen J. Kalafut
*Attorney, Agent, or Firm*—John Lezdey

[57] ABSTRACT

An electrode suitable for use in energy storage devices is described which is made of an assembly of an electrically conductive carbonaceous material having conjugated and preferably polybenzenoid plate-like structures. The carbonaceous material has a Youngs modulus of greater than 1,000,000 psi. The so-defined electrode material does not undergo a substantial change in dimension during repeated electrical charge and discharge cycles. Additionally there is described an energy storage device utilizing the above described electrode.

10 Claims, 3 Drawing Sheets

SECONDARY ELECTRICAL ENERGY STORAGE DEVICE AND ELECTRODE THEREFOR

CROSS REFERENCE TO RELATED APPLICATIONS

This application is a continuation in part of our co-pending application Ser. No. 558,239 filed Dec. 5, 1983 entitled "Energy Storage Device", now abandoned.

BACKGROUND OF THE INVENTION

The invention resides in the use of a carbonaceous material in conjunction with an electron collector as an electrode for secondary electrical energy storage devices. The carbonaceous material of the electrode, is stable in the presence of an electrolyte system containing anions such as perchlorates, hexafluoroarsenates, and the like, under ambient or normal operating temperatures of use of the electrode. That is to say, the carbonaceous material does not appreciably irreversibly swell or contract during deep electrical charge and discharge cycles such as may be performed in the operation of a secondary electrical energy storage device.

Numerous patents and technical literature describe electrical energy storage devices utilizing carbonaceous material such as carbon or graphite as an electrode material. Of course, one of the earliest of these devices was the Laclanche' battery of 1866 wherein carbon was used as an electron collector in a $Zn/NH_4Cl/MnO_2$ primary battery. Since then carbon has been used extensively as a component of the electrode in primary batteries, primary fuel cells, secondary fuel cells, secondary batteries and capacitors. The function of the carbon or graphite in these aforementioned devices has been primarily that of a current collector or as a reactive material to form new compounds with fluorine which have different structures and properties than the original carbon/graphite, and most recently, as semiconductor materials which form salts with ions of the electrolyte. These prior art devices can be categorized as: primary batteries such as is disclosed in Coleman et al. in U.S. Pat. No. 2,597,451, Panasonic Lithium Battery literature, and U.S. Pat. Nos. 4,271,242, 3,700,502, and 4,224,389; fuel cells, such as Japanese Publication No. 54-082043; and, secondary fuel cells, with limited rechargeability, such as is described in Dey et al. U.S. Pat. No. 4,037,025, a rechargable fuel cell employing an activated (high surface area) graphite; rechargable secondary batteries (accumulators) such as is disclosed in Hart U.S. Pat. No. 4,251,568 employing graphite as a current collection , and Bennion U.S. Pat. Nos. 3,844,837 and 4,009,323 and capacitors such as in Butherus et al. U.S. Pat. No. 3,700,975 or German Pat. No. 3,231,243 using a high surface area carbon (graphite).

Some of these devices also utilize ionizable salts dissolved in a nonconductive solvent.

The carbonaceous materials described in the patents and in the literature are materials graphitized or carbonized until the materials become electrically conductive. These materials are derived from polyacetylenes, polyphenylenes, polyacrylonitriles, and petroleum pitch which have been heated to "carbonize and/or graphitize" the precursor material to impart some degree of electrical conductivity. Some of the graphites used in the prior art literature are graphites such as RPG (Reinforced Pyrolytic Graphite), R-1 nuclear reactor grade graphite, PGCP (Pyrolytic Graphite Carbon Paper), and GRAFOIL (a Trademark of the Union Carbide Corporation) comprising an expanded and compressed graphite, and the like.

Doping of analogous carbonaceous materials has also been reported in Chemical and Engineering News, Volume 60, No. 16, pp. 29-33, Apr. 19, 1982, in an article entitled "Conducting Polymers R & D Continues to Grow"; Journal Electrochem Society, Electrochemical Science, 118, No. 12, pp. 1886-1890, December 1971; and Chemical & Engineering News, 59, No. 41, pp. 34-35, Oct. 12, 1981, entitled "Polymer Cell Offers More Power, Less Weight".

The problems attendant with these reported cells are that they do not have a long life since the electrode made from such carbonaceous material is susceptible to degradation when subjected to repeated electrical charge and discharge cycling.

For example, U.S. Pat. No. 3,844,837 (Bennion et al.) describes a battery employing a nuclear grade graphite impregnated with chips of $Li_2O$ as the positive electrode and copper as the negative electrode in a LiCF$_3$SO$_3$-dimetyl sulfite (DMSU) electrolyte. The graphite electrode was made from a grade R-1 nuclear graphite (sold by Great Lakes Carbon Company) and was reported to be flaky after 9 cycles of electrical charge and discharge. The patentees also tested a graphite cloth and concluded it to be unsatisfactory. Several other graphites were used with equally unsatisfactory results with the best results obtained from pyrolytic graphite which failed after 33 cycles. In Dey et al. who employs a high surface area carbon or graphitic material, within the pores of which the chemical reaction occurs, is generally thought to be of a low conductance through lack of continuity of the carbon surface. Further, it is believed that such materials do not maintain the dimensional stability and structural integrity necessary for the reversible formation of carbon complexes required for long rechargeable cycle life of secondary batteries.

Experiments conducted in the course of the development of the present invention included the use of GRAFOIL (Trade Mark) which failed on the first electrical charge and RPG (Super Temp) graphite electrodes which also failed. It was found that an amount greater than 20% of the positive electrode made from RPG graphite was lost as flakes, chips and powder after only 27 electrical charge and discharge cycles.

It is to be noted that the prior art identifies the disintegration and damage to the electrode as being a result of a swelling and shrinking of the electrode body and that this swelling and shrinking increases with each electrical charge and discharge cycle which distorts the graphite platelets which flake off due to the stress of swelling and shrinking. In conducting these experiments in the course of the development of the present invention, it was confirmed that such flaking-off of the graphite platelets occurs when the aforementioned graphite materials were subjected to repeated electrical charge and discharge cycles.

Brief Description of the Invention

According to a first aspect, the present invention provides an electrode, particularly for use in a secondary electrical energy storage device comprising an electrode body of electrically conductive carbonaceous material and a current collector electrically associated therewith, characterized in that the said carbonaceous material has a skeletal orientation at least at or near the surface, a Young's modulus of greater than 1,000,000 psi (6.9 GPa) and up to about 55,000,000 psi (380 GPa) and undergoes less than 5% irreversible change in dimension during electrical charge and discharge cycling.

According to a second aspect, the invention provides a secondary electrical energy storage device comprising a housing constructed of an electrically non-conductive interior surface and an exterior or laminar surface comprising a moisture-impervious material, at least one cell positioned in said housing, each cell comprising at least one pair of electro-conductive electrodes electrically insulated from contact with each other, each cell containing a substantially non-aqueous electrolyte, wherein at least one of the electrodes of each cell is an electrode of the invention.

The electrodes can be separated from each other by distance or by a non-electrically conductive ion-permeable material.

Preferably, the electrically conductive carbonaceous material of the electrode should have the following physical property criteria:

(1) A Young's modulus of greater than 1,000,000 psi (6.9 GPa), preferably from 10,000,000 psi (69 GPa) to 55,000,000 psi (380 GPa), especially 20,000,000 to 45,000,000 psi (138 GPa to 311 GPa).

(2) An aspect ratio of greater than 100:1. The aspect ratio is defined herein as the length to diameter l/d ratio of a fibrous or filament strand of the carbonaceous material or as the length to depth ratio when the carbonaceous material is formed as a planar sheet.

(3) The structural and mechanical integrity of the carbonaceous material in whatever fabricated form it may be (woven, knit or non-woven from continuous filament or staple fibers or a film) must be such that it does not require the presence of a support such as a pressure plate (face films or mesh) to maintain the carbonaceous material in the desired sheet or plate like shapes throughout at least 100 charge/discharge cycles.

(4) A surface area with respect to fiberous materials of at least 0.1 $m^2/g$ but less than one associates with activated absorptive carbon, suitably less than 50 $m^2/g$, preferably less than 10 $m^2/g$, and especially less than a 5 $m^2/g$.

(5) Sufficient integrity of the form of the carbonaceous material to enable the carbonaceous material to retain its plate or sheet like shape when of a size greater than 1 $in^2$ (2.5 $cm^2$) to greater than 144 $in^2$ (930 $cm^2$) without support other than the metallic current collector frame forming the edge portion of the electrode.

(6) The secondary electrical energy storage device in which the electrode of this invention is employed should be substantially free of water to the extent of less than 100 ppm. Preferably, the water content should be less than 20 ppm and most preferably less than 10 ppm. The device of the invention is capable of operating with water content of up to 300 ppm but will have a somewhat reduced cycle life. Further, it is to be understood that should the wafer content level become onerous, the device may be disassembled, dried and reassembled in such dry state without substantial damage to its continued operability.

Performance Criteria (7) The carbonaceous material of an electrode should be capable of sustaining more than 100 electrical charge and discharge cycles without any appreciable damage due to flaking of the carbonaceous material. Preferably, no appreciable damage should occur after more than 500 electrical charge and discharge cycles, at a discharge capacity of a greater than 150 coulombs per gram of carbonaceous material of an electrode.

(8) The coulometric (coulombic) efficiency of the arbonaceous material of the electrode should be greater than 70 percent, preferably greater than 80 percent and most preferably greater than about 90 percent.

(9) The carbonaceous material of the electrode should be capable of sustaining deep electrical discharges of greater than 70 percent of its electrical charge capacity for at least 100 cycles of electrical charge and discharge, and preferably greater than 80% for more than 500 electrical charge and discharge cycles.

Accordingly, the carbonaceous material of an electrode having the physical properties hereinbefore described preferably should be capable of sustaining electrical discharge and recharge of more than 100 cycles at a discharge capacity of greater than 150 coulombs per gram of carbonaceous material in an electrode and at a coulometric efficiency of greater than 70% without any substantial irreversible change in dimensions (dimensional change of less than about 5%).

Usually, the carbonaceous material will be obtained by heating a precursor material to a temperature above 850° C. until electrically conductive. Carbonaceous precursor starting materials capable of forming the electrically conductive oriented carbonaceous material portion of the electrode may be formed from pitch (petroleum or coal tar), polyacetylene, polyacrylonitrile, polyphenylene, SARAN (Trade Mark), and the like. The carbonaceous precursor starting material should have some degree of skeletal orientation, i.e., many of these materials either have substantial concentrations of oriented benzenoid structural moieties or moieties which are capable of conversion, on heating, to benzenoid or equivalent skeletal orientation at or near the surface because of the skeletal orientation of the starting material.

Exemplary of preferred carbonaceous precursor materials which exhibit such skeletal orientation on heating are assemblies of multi or monofilament strands or fibers prepared from petroleum pitch or polyacrylonitrile. Such multi or monofilament strands or fibers are readily converted into threads or yarns which can then be fabricated into a cloth-like product. One technique for producing suitable monofilament fibers is disclosed in U.S. Pat. No. 4,005,183 where the fibers are made into a yarn which is then woven into a cloth. The cloth is then subjected to a temperature, usually above 1000° C., sufficient to carbonize the cloth to make the carbonaceous material electrically conductive and so as to provide the material with the physical property characteristics hereinbefore described under paragraphs (1) through (6). Such a cloth, in conjunction with an electron collector, is particularly suitable for use as an electrode in the secondary electrical energy storage device of the present invention.

Advantageously, the carbonaceous precursor material is in the form of a continuous filament fiber, thread(s) constituted of continuous filament(s) or noncontinuous fiber tow (yarn) which can be made into assemblies such as woven, non-woven, knitted assemblies, or the staple fibers per se layered to form a cloth, paper-like or felt-like planar member. However, acceptable results are obtained when yarns made from short fibers (about 1 to 10 cm long) are woven into a cloth-like product (provided such short fibers still have, when heat treated, the required physical properties hereinbefore mentioned under (1) through (6)). It is of course to be understood that while it is advantageous to form the precursor material, preferably in a stabilized state (such as is obtained by oxidation), into the desired form (knit, woven or felt) prior to carbonization, such construction may be done after carbonization if the modulus is below about 55,000,000 psi (380 GPa) and preferably below about 39,000,000 psi (269 GPa) for machine fabrication. It is of course to be understood that the carbonaceous material may be formed from a film precursor.

The degree of carbonization and/or graphitization does not appear to be a controlling factor in the performance of the material as an electrode element in an electrical storage device except that it must be enough to render the material sufficiently electrically conductive and is also enough to provide the aforementioned physical and mechanical properties under the designated use conditions. Carbonaceous materials having about 90 percent carbonization, are referred to in the literature as partially carbonized. Carbonaceous materials having from 91 to 98 percent carbonization are referred to in the literature as a carbonized material, while materials having a carbonization of greater than 98 percent are referred to as graphitized. It has surprisingly been found that carbonaceous materials having a degree of carbonization, of from 90 to 99 percent, have failed as an electrode materials unless the carbonaceous material has the required dimensional stability during electrical charge and discharge cycling. For example, RPG graphite and GRAFOIL, while having the requisite degree of carbonization, electrical conductivity an surface area, do not have the required physical properties of Young's Modulus and aspect ratio and thus have failed.

In accordance with the invention, a rechargable and polarity reversible electrical storage device can be prepared by aligning at least one pair of electrodes made from the aforedescribed carbonaceous material and its associated electron collector (which are electrically conductive), in a housing. The housing has a non conductive interior surface and is impervious to moisture. The electrodes are immersed in a non-aqueous (water being present in an amount of less than about 100 ppm) fluid contained in said housing. The fluid itself must be capable of forming, or contains dissolved therein, at least one ionizable metal salt. Each such electrode is comprised of the carbonaceous heat treated material, of the present invention associated with an electron collector which is preferably insulated against contact with the electrolyte fluid.

The secondary electrical energy storage device of the invention may be constructed without the polarity reversing capability by aligning the aforementioned electrically conductive carbonaceous fiber assembly, such as a cloth, and its electron collector as the positive electrode alternating with a negative electrode which may be constructed of a metal, such as lithium, or a metal alloy and immersing the electrodes in a substantially non-aqueous fluid, which fluid itself is capable of forming or which contains at least one ionizable soluble metal salt dissolved therein to provide electrolyte ions.

In the construction of a preferred embodiment of the secondary electrical energy storage device of the present invention, conventional porous separators of fiberglass, polymeric materials, or composites of polymeric materials, may be and are preferably employed to separate the positive and negative electrodes from each other. Most preferably a nonwoven polypropylene sheet is employed as the separator since it has the desired degree of porosity and yet has a sufficient tortuous path to prevent carbonaceous fibers from penetrating through it, thus preventing electrical shorting. (The porous separators also beneficially act as stiffeners or supports for the electrodes.)

Energy storage devices which are contained in fluid-tight housings are generally known in the art. Such housings may be suitably employed in the present invention as long as the housing material is preferably electrically non-conductive or at least insulated from contact with one electrode and is impervious to gases and/or moisture (water or water vapor).

The materials found chemically compatible as a housing material include polyvinylchloride, polyethylene, polypropylene, polytrifluoroethylene and related perfluorinated polymers, instant set polymer (ISP), a rapidly solidifying reactive urethane mixture, the aramids, a metal clad with a non-conductive polymeric material such as an epoxy e.g. DER* 331 or with DERAKANE*, ZETABON* and/or glass or a metal oxide, fluoride or the like. Housing materials found not to be suitable in the preferred propylene carbonate system include acrylics, polycarbonate and nylon. Acrylic's craze, polycarbonate's both craze and become extremely brittle, while nylon (except for the aramids) is chemically reactive.

*Trademark of The Dow Chemical Company

In addition to being compatible, a housing material must also offer an absolute barrier (about $<0.2$ grams of $H_2O/yr/ft^2$ or 0.02 grams of $H_2O/yr/m^2$) against the transmission of water vapor from the external environment of the housing. No presently known thermoplastic materials alone offers this absolute barrier against moisture at a thickness which would be useful for a battery housing. At present only metals, for example aluminum or mild steel, offer an absolute barrier against moisture at foil thicknesses. Aluminum foil having a thickness of greater than 0.0015 in. (0.038 mm) has been shown to be essentially impervious to water vapor transmission. It has also been shown that when laminated to other materials, aluminum foil as thin as 0.00035 in. (0.009 mm) can provide adequate protection against water vapor transmission. Suitable housings made of metal-plastic laminate, CED-epoxy-coated metal (cathodic electro deposited), or metal with an internal liner of plastic or glass presently satisfies the requirements for both chemical compatability and moisture barrier ability. Most of the cells and batteries built to date have been tested in either a dry box having a $H_2O$ level of $<5$ ppm, a glass cell or a double walled housing with the space between the walls filled with an activated molecular sieve, e.g. 5A zeolite.

The electrolyte fluid preferably consists of a non-conductive, chemically stable, non-aqueous solvent for ionizable salt or salts wherein the ionizable salt is dissolved in the solvent. One can employ as the solvent those compounds that are generally known in the art such as, for example, compounds having oxygen, sulfur, and/or nitrogen atoms bound to carbon atoms in an electrochemically non-reactive state. Preferably, one can employ nitriles such as acetonitrile; amides such as dimethyl formamide; ethers, such as tetrahydrofuran; sulfur compounds, such as dimethyl sulfite; and other compounds such as propylene carbonate. It is, of course, to be understood that the solvent itself may be ionizable under conditions of use sufficient to provide the necessary ions in the solvent. Thus, the ionizable salt must be at least partially soluble and ionizable either when it is dissolved and goes into solution into the solvent or upon liquification. While it is to be understood that slightly soluble salts are operable, it will be recognized that the rate of electrical charging and discharging may be adversely affected by the low concentration of such salts in solution.

Ionizable salts which may be employed in the practice of the invention are those taught in the prior art and include salts of the more active metals, such as, for example, the alkali metal salts, preferably lithium, sodium or potassium, or mixtures thereof containing stable anions such as perchlorate ($ClO_4^-$), tetrafluoroborate ($BF_4^-$), hexafluoroarsenate ($AsF_6^-$), hexafluoroantimonate ($SbF_6^-$) or hexafluorophosphate ($PF_6^-$).

The electrolyte (solvent and salt) must be substantially water-free, that is, it should contain less than 100 ppm of water, preferably less than 20 ppm of water and most preferably less than 10 ppm of water. Of course, the electrolyte can be made up having more than the desired amount of water and dryed as for example, over activated zeolite 5A molecular sieves. Such agents may also be combined into the finished battery to ensure that the low level water requirement is maintained. The electrolyte should also be such as to permit ions (anions and cations) of the ionizable salt to move freely through the solvent as the electrical potential of charge and discharge move the ions to and from their respective poles (electrodes).

The electrode, when constructed as a cloth or sheet, includes an electron collector conductively associated with at least one of the edges of the carbonaceous fibers or sheet. The edge(s) is preferably further protected by a material to insulate the collector and to substantially protect the electron collector from contact with the fluid and its electrolyte ions. The protective material must, of course, be unaffected by the fluid or the electrolyte ions.

The current collector intimately contacts the carbonaceous material of the electrode at least along one edge and preferably on all four edges thereof when the carbonaceous material is in the form of an assembly such as a planar cloth, sheet or felt. It is also envisioned that the electrode may be constructed in other shapes such as in the form of a cylindrical or tubular bundle of fibers, threads or yarns in which the ends of the bundle are provided with a current collector. It is also apparent that an electrode in the form of a planar body of cloth, sheet or felt can be rolled up with a porous separator between the layers of the carbonaceous material, and with the opposed edges of the rolled up material, connected to a current collector. While copper metal has been used as a current collector, any electro-conductive metal or alloy may be employed, such as, for example, silver, gold, platinum, cobalt, palladium, and alloys thereof. Likewise, while electrodeposition has been used in bonding a metal or metal alloy to the carbonaceous material, other coating techniques (including melt applications) or electroless deposition methods may be employed as long as the edges or ends of the electrode, including a majority of the fiber ends at the edges of the carbonaceous material are wetted by the metal to an extent sufficient to provide a substantially low-resistant electrical contact and current path.

Collectors made from a non-noble metal, such as copper, nickel, silver or alloys of such metals, must be protected from the electrolyte and therefore are preferably coated with a synthetic resinous material or an oxide, fluoride or the like which will not be attacked by the electrolyte or undergo any significant degradation at the operating conditions of a cell.

Electrodes of the present invention made from the electrically conductive carbonaceous material and its current collector can be employed as the positive electrode in a secondary energy storage device. No substantial damage to the electrode itself or the electrolyte, i.e., solvent and ionizable salt, is observed when undergoing repeated charges at a capacity of greater than 150 coulombs per gram of active carbonaceous material, and deep discharges at a depth of greater than 80 percent of the total capacity of the electrode at fast or slow rates of charge/discharge.

Alternatively, electrodes of the invention made from the electrically conductive carbonaceous material and its current collector can also be employed as both the positive and negative electrodes in an accumulator (secondary battery) with similar beneficial operating characteristics as hereinbefore described.

A surface area of at least 0.5 square meters per gram and a low resistivity of less than 0.05 ohm/cm of the carbonaceous material employed for the electrode of the invention are desirable properties. Thus, a battery constructed with the carbonaceous material electrodes of the invention has an extremely low internal resistance and a very high corresponding coulometric efficiency which usually is greater than 80 percent.

During the investigative period for the limits of the present invention it was found that initial current densities on charge greater than about 100–200 mA/in$^2$ (15.5 to 31 mA/cm$^2$) can result in damage to the carbonaceous material of the electrode.

Detailed Description of the Invention

EXAMPLE 1

A pair of electrodes each having an area of 11 in$^2$ (71 cm$^2$) were prepared from a Panex (Trade Mark) PWB-6 cloth (a cloth which had been heat treated at a temperature greater than 1000° C. by the manufacturer which rendered this cloth electroconductive) purchased from Stackpole Fibers Industry Company. The cloth was woven from a polyacrylonitrile (PAN) precursor in which the yarn was manufactured from non-continuous filaments (staple fibers) having an average length of about 2 inches (5 cm) and a diameter of 7 to 8 micrometers and an aspect ratio of ca 700:1. The cloth was heat treated by the manufacturer after weaving. The edges of the heat treated cloth were coated with copper by electroplating to provide a current collector. A wire was soldered to one end of the copper coated edges. All four edges of each electrode, (current collector) and wire connector, were coated with an amine curable epoxy resin, DER (Trade Mark) 331, manufactured by The Dow Chemical Company, to insulate the metal from the corrosive effects of the electrolyte under the conditions of use. The pair of electrodes were immersed in an electrolyte comprising a 15 percent solution of $LiClO_4$ in propylene carbonate contained in a polyvinylchloride (PVC) housing. The electrodes were spaced less than 0.25 inch (0.6 cm) apart. The assembly of the electrodes into the housing was carried out in a dry box. The housing was sealed while in the dry box with the wires extending from the housing. The water content in the assembled housing was less than 10 ppm. The fibers had a Young's modulus of about 33,000,000 psi (230 GPa) and an area to weight ratio of 0.6 to 1.0 $m^2/g$. The total electrical capacity of the active carbonaceous material of the electrode was determined to be about 250 coulombs/g.

The cell so-prepared was electrically charged at a maximum voltage of 5.3 volts with the current limited from exceeding 35 milliamps per square inch (5.4 milliamps/$cm^2$) electrode face area. The cell was electrically charged and discharged 1250 cycles over an 11 month period and exhibited a coulometric efficiency of greater than 90 percent conducted at a discharge capacity of greater than 85 percent. The cell was then dismantled and the fibers from each of the cloth electrodes were examined under a microscope with 1000 power magnification. Insofar as measurable, the fibers had the same diameter as the fibers from the same lot which had not been used in the cell. The cell was reassembled and testing continued in the same manner as hereinbefore described. The cell, has completed, thus far, over 2,800 charge and discharge cycles over an 23 month period without a reduction in coulometric efficiency, it still has a coulometric efficiency of greater than 90 percent.

EXAMPLE 2

Six electrodes similar to the electrodes of Example 1 were prepared and connected in a three cell unit such that each of the three pairs of the electrodes were sealed in separate polyethylene pockets (bags). The electrodes were connected in series. The three cell unit was operated in the same manner as in Example 1 except that the voltage was about 16 volts. The initial open circuit voltage was about 13.5 volts. After 228 electrical charge and discharge cycles, during which the discharge was conducted at a deep discharge of greater than 78 percent of total capacity, the cells were dismantled and the electrodes were removed from their pockets and the electrodes examined for signs of deterioration, i.e., flaking and excessive swelling and shrinking of the fibers. The examination showed no detectable change in fiber diameter from fibers measured in the same lot of cloth that had not been used to prepare the electrode of this Example. Measurements were conducted with a laser interferometer.

EXAMPLE 3

Several planar sheets were cut from a cloth woven from yarn made from an essentially continuous monofilament precursor fiber made from petroleum pitch. The fibers were manufactured by the Union Carbide Company and sold under the Trade Name Thornel (Trade Mark). The precursor fiber tow yarn with an aspect ratio of about 800:1 had been woven into a cloth and then heat treated at a temperature of greater than 2000° C. The planar sheets each had a dimension of about one square foot (930 $cm^2$) in area. The fiber had a Young's modulus of 45,000,000 psi (315 GPa) and a surface area of about 1 $m^2/gm$ after heat treatment. The sheets were plated with copper metal along their four edges so that all fibers were electrically connected to form an electron collector frame. An insulated copper wire was attached to one edge of the collector near a corner by solder and the solder joint and copper collector was coated with DERAKANE* brand of a curable vinyl ester resin. Each pair of sheets were aligned parallel to each other with the soldered wires at opposite ends of the matching edges and separated by a foraminous, non-woven, fibrous, polypropylene composite sheet having a thickness of 5 mils (0.1 mm). A polyethylene pocket (bag) of a size of about one square foot (930 $cm^2$) was employed as a cell container. Three cells were assembled in a dry box by placing a pair of the carbon fiber sheets and their separator into each of three pockets and filling each pocket with about 500 grams of an electrolyte of 15 weight percent solution of $LiClO_4$ in propylene carbonate. The electrolyte level in the pocket was determined to provide 21 grams of active fiber per electrode (the area of the electrode exposed to the electrolyte). The remainder of the carbon fibers of each electrode extended out of the solution or was covered by the Derakane (Trade Mark) resin/copper metal frame.

*Trademark of the Dow Chemical Company

Assembly of the cells in a dry box maintained the water content at less than 20 ppm of electrolyte solution. Each pocket was sealed while in the dry box, in a manner to allow the soldered wire ends to extend through the seal at opposite ends of the sealed edge. The three cells so-prepared were placed in a clear plastic box and the wires connected in series. A quantity of activated zeolite 5A molecular sieves (to absorb moisture) was added over the top of the cells and the assembly was removed from the dry box. The end wires of the two end plates of the three cell series were connected to terminals extending through a cover or lid for the box and the cover quickly sealed to the box.

The assembly was charged at a potential of 15 to 16 volts, and at a current of 1.8 to 2 amps, for 45 minutes. Thereafter the device was discharged through a 12 volt automobile headlight drawing an average current of from 2.0 to 2.5 amps. The device was discharged to 90 percent of its capacity in 30 minutes. The electrical charge and discharge cycles were conducted over 850 times. The cell was then disassembled and the fibers examined under a microscope at 1000 times magnification and showed no detectable signs of swelling or deterioration due to flaking. The device was accepting an electrical charge and deep discharge at 90 percent of capacity for each cycle.

EXAMPLE 4

A PAN base (precursor fiber) cloth was obtained from R. K. Textile, Ltd., Heaton Moor, U.K. The cloth was sold under the trade name Panox (Trade Mark) and was a non-conductive carbon fiber with an aspect ratio of greater than 250:1 made into yarn and woven cloth and, reportedly, had not been heated to a temperature above 400° C. The cloth was heat treated at a temperature of about 1000° C. for a time sufficient to make the cloth electroconductive. The heat treated cloth had a Young's modulus of 23,000,000 psi (160 GPa) and a surface area of about 1 $m^2/gm$. Two samples of cloth each having a width of 2 inches (5 cm) on a side and an area of 4 $in^2$ (26 $cm^2$) were cut from the heat treated cloth and the four edges of each cloth were plated with copper metal to form a current collector for the electrode. A wire was soldered to one corner of the current collector of each electrode. The solder and copper current collector were coated with a Derakane (Trade Mark) brand vinyl ester resin coating composition. A non-woven polypropylene composite sheet, Celgard (Trade Mark) 5511, was positioned between the two electrodes and the electrodes were inserted into a plastic pocket (envelope). This assembly was placed in a dry box wherein the water content was maintained at less than 20 ppm of electrolyte solution. A 10 weight percent solution of $LiClO_4$ in a propylene carbonate solution was used to fill the envelope until the two electrodes were submersed in the electrolyte solution. The wires from each electrode were connected to a double pole, double throw switch, one terminal of which was connected to an electrical voltage source of 5.3 volts. The other terminal was connected to an electrical resistance load of 10 ohms. The cell was deep discharged to greater than 80 percent of its total charge and operated in excess of 800 electrical charge and discharge cycles with a coulometric efficiency of greater than 80 percent. The capacity of this cell was about 70 percent of that of the PAN example (Example 1) on a total electrode weight basis.

Cells constructed in accordance with the present invention have been found to have an internal resistance which is, on the average, less than 0.038 ohm/ft$^2$ (0.35 ohm/m$^2$) of electrode face area in a six electrode cell. This value, originally measured as less than 1 ohm, included the lead wires to the charging system having a length of about 6 meters. On measuring the resistance of the leads and then remeasuring the total resistance of the system from the charge, the resistance of the accumulator (secondary battery) proper was calculated to be 0.038 ohm/ft$^2$ (0.35 ohm/m$^2$).

A confirmation of the data of the above examples was carried out by a co-worker in a 2 electrode cell made from "Thornel" cloth, VCB-45 having a Young's modulus of 45,000,000 psi (315 GPa), a surface area of 1 m$^2$/g and an aspect ratio of greater than 10,000:1, in which each cloth had a dimension of 15.2 cm×15.2 cm. Copper edges were plated around all four edges of the cloths to form the current collector. The current collector was then coated with DERAKANE (Trade Mark) 470-36. The current collector edges were about 2.6 cm wide, leaving active carbonaceous material areas of about 10 cm×10 cm. The 100 cm$^2$ area of each electrode contained about 6 grams of carbon fiber.

The electrodes were separated by placing one electrode in a heat sealed bag of "Celgard" (Trade Mark) 5511 microporous polypropylene film.

The assembly of electrodes and separator was placed in a polyethylene bag, the bag filled with a dry electrolyte of 15% by weight $LiClO_4$ in propylene carbonate (about 100 cc) and the assembly squeezed between two plastic edge pressure plates which support the sides of the bag holding the electrolyte. The thickness of the DERAKANE-coated copper current collector kept the fibrous portion of the two electrodes from being pressed into minimal separation distance with each other. In later runs, a 10 cm×10 cm spacer plate was inserted between the edge pressure plates to press the electrode-separator combination more tightly together. This lowered the cell resistance from about 0.95 ohm down to about 0.75 ohm.

Discharge data at various discharge rates were taken for two of above described configurations of the cell. In one case (0.95 ohm cell) the electrode separation was limited by the epoxy coating on the current collector to approximately 4 mm. In the other case (0.75 ohm cells), the electrodes were forced together at the center with only the porous polypropylene separator between them (less than 1 mm).

Figure 1:
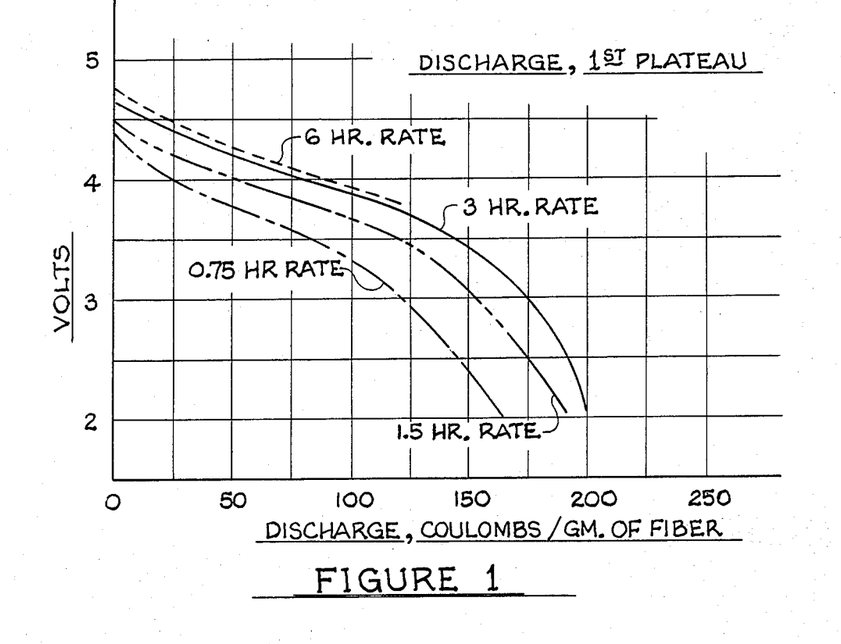
FIG. 1 and 2 illustrate in graph form the terminal voltage plotted against the discharge in coulombs/g of fiber for Example 4 0.75 and 0.9 ohm cells.

In the graph of the FIG. I, Curve I, shows the terminal voltage vs. the discharge at coulombs/g of fiber for the 0.95 ohm cell at several discharge rates ranging from 6 hours to ¾ hour. These discharges correspond to a so-called first plateau (2 volt cutoff). If one assumes that the total capacity of the 1st plateau is 180 coulombs per gram to the 2 volt cutoff voltage, the values on the abscissa can be replaced with "% discharged"; with "180 coulombs/gm" equivalent to "100% discharged".

The total energy recovered at a 3 hour rate at constant load is almost the same as at the 6 hour rate. At the fast ¾ hour rate discharge, inefficiencies are generated and occur due to cell resistance and electrode polarization. The electrode current densities corresponding to these discharge rates are:

| Rate (hours) | Ave. Current density at constant load (ma/cm$^2$) |
| --- | --- |
| 6 | 0.5 |
| 3 | 1.0 |
| 1.5 | 2.0 |
| 0.75 | 4.0 |

The "coulombs per gram of fiber" is based on the weight of the active carbonaceous material of one electrode only.

Figure 2:
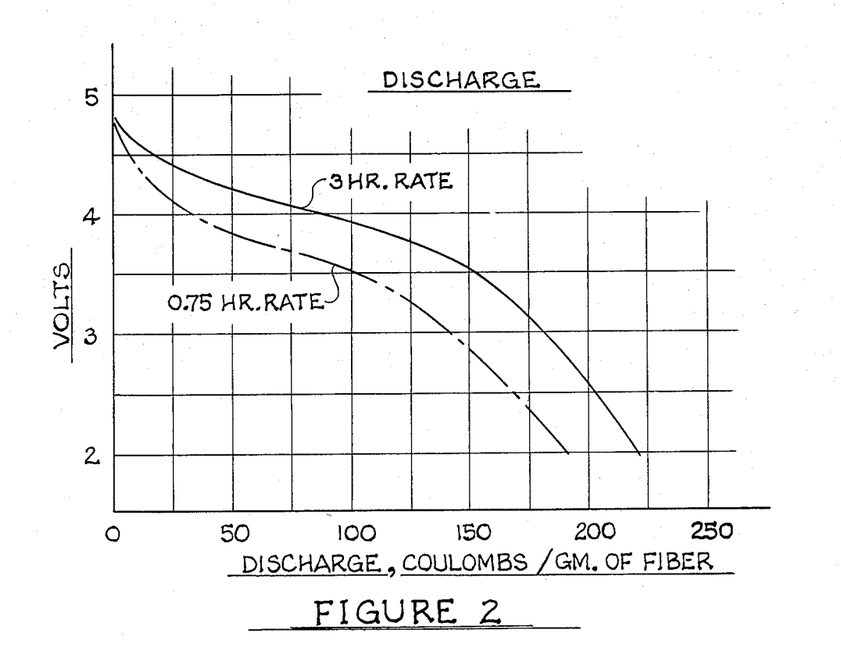
Figure 3:
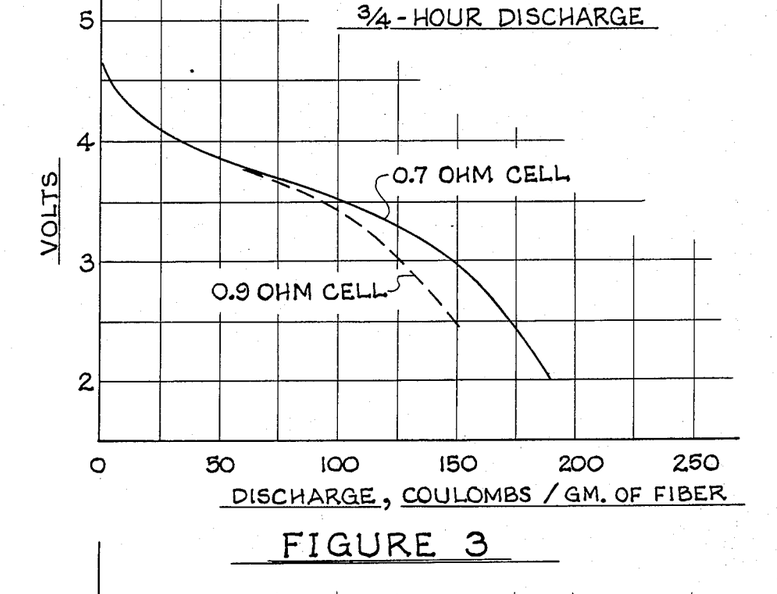
FIG. 3 illustrates a component of the two cells in graph form, at higher a discharge rate.

Curve II shows the data for the 0.75 ohm cell. Obviously, more energy is available for the cell with the lower resistance. Curve III shows the comparison of the two cells at the higher discharge rate (¾ hr rate).

A lithium metal reference electrode was inserted into the cell to determine which electrode was polarizing. The voltage drops between each electrode and the reference electrode were determined during charge and discharge and on opening the circuit.

On opening the circuit, the voltages between the negative electrode and the reference electrode were generally less than 100 mv and changed only slightly with time. The voltage, when measured between the positive electrode and the reference electrode, changed with time, decreasing after each charge and increasing after each discharge.

The maximum power capabilities of a battery cell at different stages of charge were determined by pulse discharging the cell at loads that gave terminal voltages of one-half of open circuit voltage. The "pulses" were 10 seconds long and the power was calculated as the average power over the 10 seconds.

Figure 4:
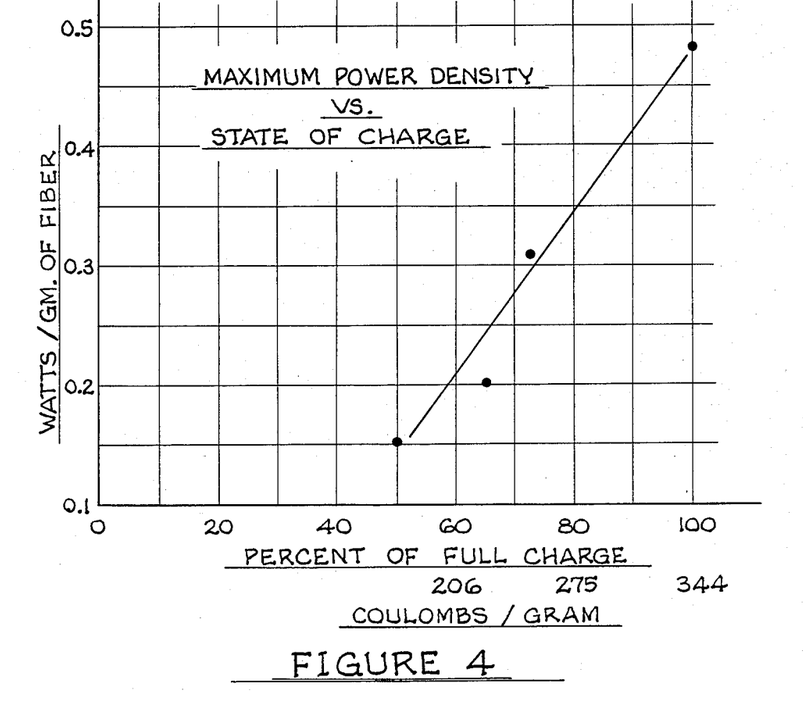
FIG. 4 illustrates in graph form the power capability (density) vs state of charge for the 0.9 ohm cell of Example 4.

The cell was first charged to 344 coulombs per gram of active carbonaceous material in one electrode. This was taken as a 100% state of charge. Maximum current drawn from the 10 cm×10 cm electrode cell at 100% state of charge was 2.5 to 3.0 amperes. Subsequent power determinations were made at levels of 247 coulombs per gram (72% charge) and 224 coulombs per gram (65% charge). Curve IV shows the results.

Figure 5:
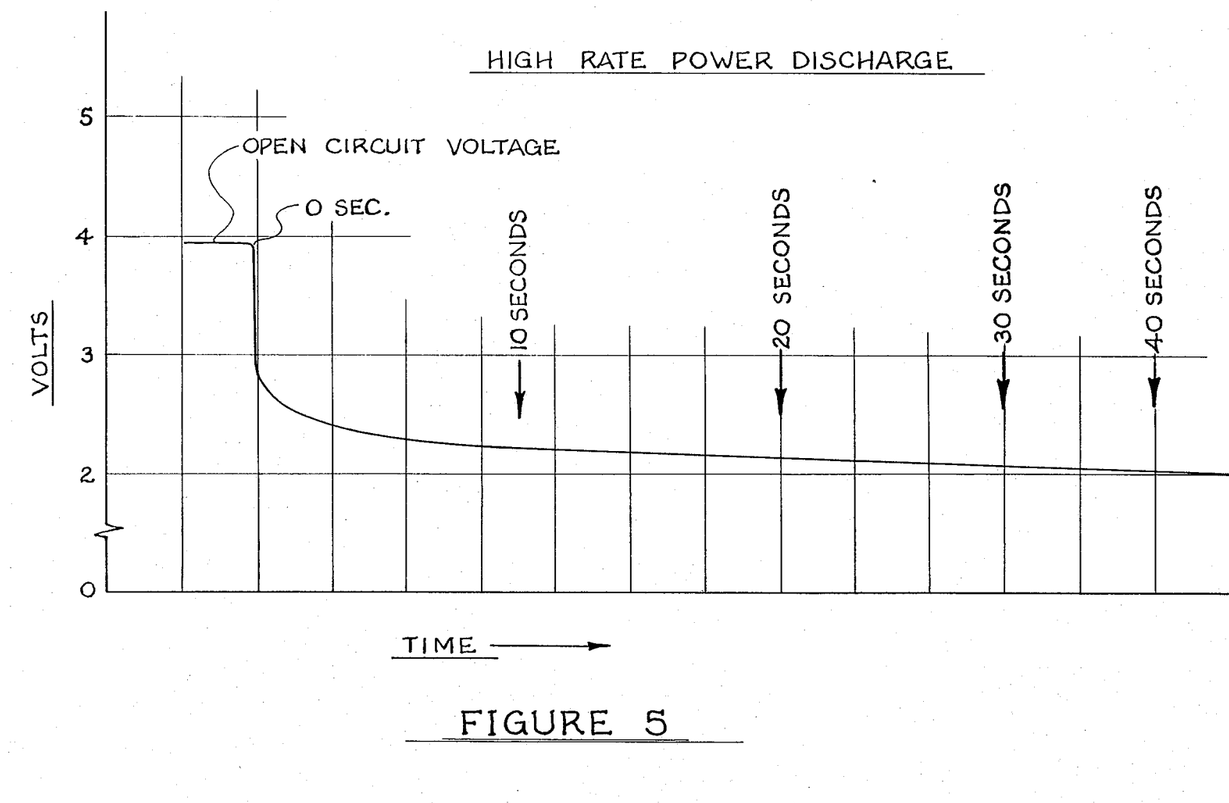
FIG. 5 illustrates the voltage trace of a forty second maximum power rate discharge of the 0.9 ohm cell of Example 4.

Maximum power from this cell was about 0.48 watts per gram of fiber at 100% state of charge, dropping to about 0.31 watts per gram of fiber at 72% state of charge. The power capabilities drop rapidly after that since the voltage drops and polarization sets in. A pulse discharge of longer than 10 seconds does not necessarily reduce the final power a great deal. Curve V shows the voltage trace of a 40 second maximum power rate discharge. After the 1st 10 seconds, the voltage drop is small.

EXAMPLE 5

A three cell battery was constructed from twelve plates, four per cell, of Thornel brand fiber described in Example 3. Each plate was approximately 12 inches square (144 sq. in.), and had been copper plated on each edge. The copper plating about the edge was coated with Derakane (Trade Mark) brand of curable vinyl ester resin. The plates had an active area of about 132 in$^2$ (852 cm$^2$). The four plates of each cell were assembled with a foraminous polypropylene scrim separator between each plate. Pairs of plates in each cell were connected in parallel so that on charge/discharge the plates were alternately +, −, +, −. The four plates and their separators were contained in a polypropylene bag (pocket) 13 in×13 in (33 cm×33 cm) which contained about 600 cc of an electrolyte solution of 15% LiClO$_4$ in propylene carbonate. This electrolyte level in each pocket was sufficient to provide about 37 grams of active fibers per electrode plate.

The battery was initially charged over a period of 1000 minutes to a capacity of 7.9 amp hours at a potential of 14–16 volts. The cell was then discharged over a 200 minute period through a 12 volt automobile headlight putting out an average capacity of 6.2 amp hours representing greater than 80 percent depth of discharge. Recharge was carried out over an 800 minute period. An average of coulometric efficiency of approximately 90% on charge discharge cycling was observed.

What is claimed is:

1. A secondary electrical energy storage device comprising a housing having an electrically non-conductive interior surface and a moisture impervious outer surface or laminate surface having at least one cell positioned in said housing, each cell comprising a pair of electroconductive electrodes electrically insulated from contact, said housing containing a substantially non-aqueous electrolyte characterized in that at least one of said electrodes of each cell is an electrode which comprises
   an electrically conductive carbonaceous material as the active energy storing component of said electrode,
   said material characterized in that it has a Young's modulus of 1 million psi (6.9 GP a) to about 55 million psi,
   an aspect ratio of surface area to diameter and/or thickness of greater than 100 to 1,
   a surface area of between about 0.1 and about 10 square meters per gram, and
   undergoes a physical dimensional change of less than about 5% during repeated electrical charge and discharge cycling.

2. A secondary electrical storage device as claimed in claim 1, wherein the electrolyte comprises a non-conductive chemically stable, non-aqueous solvent and an ionizable salt dissolved therein.

3. A secondary electrical energy storage device as claimed in claim 2, wherein the solvent is selected from compounds having oxygen, sulfur, and/or nitrogen atoms bound to carbon atoms in an electrochemically, non-reactive state and wherein said salt is an alkali metal.

4. A secondary electrical energy storage device as claimed in claim 3, wherein the electrolyte solvent is propylene carbonate and the alkali metal salt is lithium perchlorate.

5. A secondary electrical energy storage device comprising a housing having an electrically non-conductive interior surface and a moisture impervious outer surface or laminate structure having at least one cell positioned in said housing, each cell comprising a pair of electroconductive electrodes electrically insulated from contact, said housing containing a substantially non-aqueous electrolyte characterized in that all of said electrodes of each cell is an electrode which comprises
   an electrically conductive carbonaceous material as the active storing component of said electrode,
   said material being characterized in that is has a Young's modulus of 1 million psi (6.9 GPa) to about 55 million psi,
   an aspect ratio of surface area to diameter and/or thickness of greater than 100 to 1
   a surface area of between about 0.1 and about 10 square meters per gram,
   undergoes a physical dimensional change of less than about 5% during repeated electrical charge and discharge cycling, and
   has a self-contained structural integrity in sizes of 1 to 144 square inches.

6. A secondary electrical energy storage device comprising a housing having an electrically non-conductive interior surface and a moisture impervious outer surface or laminate structure having at least one cell positioned in said housing, each cell comprising at least one pair of electroconductive electrodes electrically insulated from contact, said housing containing a substantially non-aqueous electrolyte characterized in that all of said electrodes of each cell is an electrode which comprises
   an electrically conductive carbonaceous material as the active energy storing component of said electrode,
   said material having a Young's modulus of 1 million psi (6.9 GPa) to about 55 million psi,
   undergoes a physical dimensional change of less than about 5% during repeated electrical charge and discharge cycling,
   a surface area of between about 0.1 and about 50 square meters per gram,
   has a self contained structural integrity in sizes of 1 to 144 square inches
   an aspect ratio or equivalent ratio of surface area to diameter and/or thickness of greater than 100 to 1, and
   can sustain more than 100 electrical discharge cycles of greater than 70% depth of discharge at greater than 70% coulombic efficiency without any appreciable damage to the structural integrity of the material, and having the freedom of choice of polarity on recharge and the ability to be partially and/or fully reversed polarized without harm.

7. A secondary electrical energy storage device as claimed in claim 6 having a maximum power density of over 0.31 watts per gram of active positive carbon electrode for a 40 second pulse period at full change.

8. A secondary electrical energy storage device comprising a housing at least one cell positioned in said housing, each cell comprising a pair of electro conductive positive and negative electrodes electrically insulated from contact, said housing containing a substantially non-aqueous electrolyte characterized in that at least one of said electrodes of each cell comprises

- an electrically conductive carbonaceous fibrous material having a Young's modulus of 1 million psi (6.9 (GPa) to about 55 million psi,
- an aspect ratio of surface area to diameter and/or thickness of greater than 100 to 1, and
- a surface area of between about 0.1 and about 10 square meters per gram.

9. A secondary electrical energy storage device comprising a housing having at least one cell positioned in said housing, each cell comprising a pair of electroconductive electrodes electrically insulated from contact, said housing containing a substantially non-aqueous electrolyte, characterized in that all of said electrodes of each cell is an electrode which comprises

- an electrically conductive carbonaceous sheet material having a Young's modulus of 1 million psi (6.9 GPa) to about 55 million psi,
- an aspect ratio of surface area to diameter and/or thickness of greater than 100 to 1,
- a surface area of between about 0.1 and about 10 square meters per gram,
- undergoes a physical dimensional change of less than about 5% during repeated electrical charge and discharge cycling, and
- has a self contained structural integrity in sizes of 1 to 144 square inches.

10. A secondary electrical energy storage device comprising a housing having at least one cell positioned in said housing, each cell comprising at least one pair of contact, said housing containing a substantially non-aqueous electrolyte, characterized in that all of said positive electrodes of each cell is an electrode which comprises

- an electrically conductive carbonaceous material
- said material having a Young's modulus of 1 million psi (6.9 GPa) to about 55 million psi,
- a surface area of between about 0.1 and about 50 square meters per gram,
- a self contained structural integrity in sizes of 1 to 144 square inches
- an aspect ratio or equivalent ratio of surface area to diameter and/or thickness of greater than 100 to 1, and
- can sustain more than 100 electrical discharge cycles of greater than 70% depth of discharge at greater than 70% coulombic efficiency and having the freedom of choice of polarity on recharge and the ability to be partially and/or fully reversed polarized without harm.

* * * * *

UNITED STATES PATENT AND TRADEMARK OFFICE
CERTIFICATE OF CORRECTION

PATENT NO. : 4,865,931

DATED : September 12, 1989

INVENTOR(S) : Francis P. McCullough, Jr. and Alvin F. Beale, Jr.

It is certified that error appears in the above-identified patent and that said Letters Patent is hereby corrected as shown below:

Column 2, line 21 "dimetyl" should read --dimethyl--.

Column 4, line 4, "arbonaceous" should read --carbonaceous--.

Column 5, line 31, "conductivity an" should read --conductivity and--.

Column 13, line 52, "(6.9 GP a)" should read --(6.9 GPa)--.

Column 16, lines 8 and 9, "one pair of contact" should read --one pair of electroconductive electrodes electrically insulated from contact,--.

Signed and Sealed this

Thirtieth Day of October, 1990

Attest:

HARRY F. MANBECK, JR.

Attesting Officer

Commissioner of Patents and Trademarks